Figure 1:
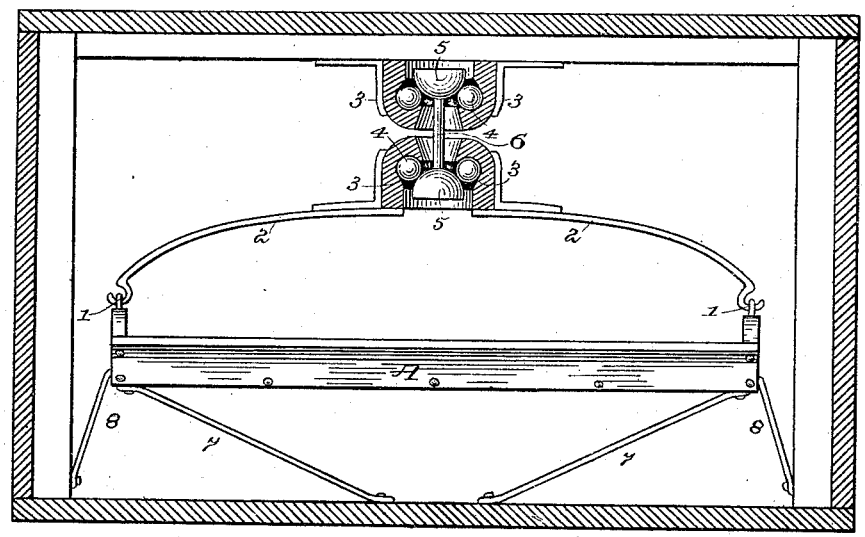

(No Model.)  A. P. BICKMORE.  2 Sheets—Sheet 1

SHIP'S BERTH.

No. 264,128.  Patented Sept. 12, 1882.

Witnesses

Inventor
Albion P. Bickmore
by Ellis Spear
Atty.

(No Model.)

A. P. BICKMORE.

SHIP'S BERTH.

No. 264,128.

2 Sheets—Sheet 2.

Patented Sept. 12, 1882.

Witnesses:
Walter Donaldson
David H. Mead.

Inventor
Albion P. Bickmore
by Ellis Spear
Atty.

UNITED STATES PATENT OFFICE.

ALBION P. BICKMORE, OF HYDE PARK, MASSACHUSETTS, ASSIGNOR OF ONE-HALF TO EDWARD B. PENDLETON, OF SAME PLACE.

SHIP'S BERTH.

SPECIFICATION forming part of Letters Patent No. 264,128, dated September 12, 1882.

Application filed January 24, 1882. (No model.)

*To all whom it may concern:*

Be it known that I, ALBION P. BICKMORE, of Hyde Park, in the county of Norfolk and State of Massachusetts, have invented a new and useful Improvement in Berths and Stalls for Vessels; and I do hereby declare that the following is a full, clear, and exact description of the same.

My invention relates to self-adjusting berths and stalls for ships, steamers, and other watercraft.

The object of it is to provide a simple mechanism for suspending the berth within small compass, while permitting perfectly free and easy adjustment without any binding or cramping of the suspending mechanism.

Heretofore berths have been suspended in various ways in order to make them automatically adjustable and maintain the berth in a horizontal position, whether the ship pitched or rolled. In some cases the berth has been suspended by a ball and socket upon the end of a fixed rod, special devices being provided for bringing the ball-and-socket connection as near as possible to the center of gravity. In this construction there is a tendency to spring and oscillate on the ball-and-socket joint and difficulty in maintaining steadiness, which does not exist when the berth is suspended from a point at greater height above it. The use of two ball-and-socket joints at the end of the suspending-rod will not accomplish the desired result, friction being so great that the berth will swing from the upper point, and thus require larger space in the cabin than can ordinarily be afforded, in order to avoid collision with the sides of the cabin or the ends. Further, with an ordinary ball-and-socket joint, when the ship is listed to one side and the suspending-rod thereby swayed to one side of the socket it is not free to swing in the pitching, but will bind against the edge about the hole.

My invention consists essentially in supporting the berth, box, or stall on a ball, or a segment of a ball, bearing upon a series of anti-friction balls, which are contained in an annular groove within the shell or case, said ball or segment bearing only on the anti-friction balls, and not touching the case.

In an ordinary state-room or cabin, where there is sufficient height, I prefer to use two joints with a rigid rod; but in providing stalls for sheep, hogs, and the like I may use only one segment moving upon the anti-friction balls and suspend the platform or stall therefrom by means of chains.

Figure 2:
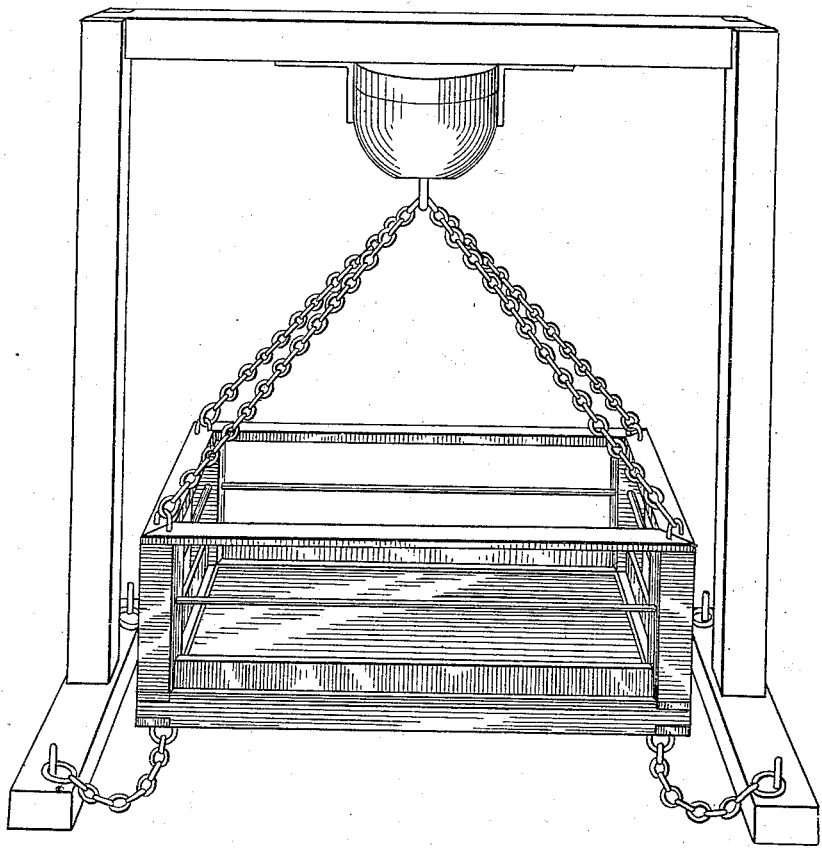
Figure 3:
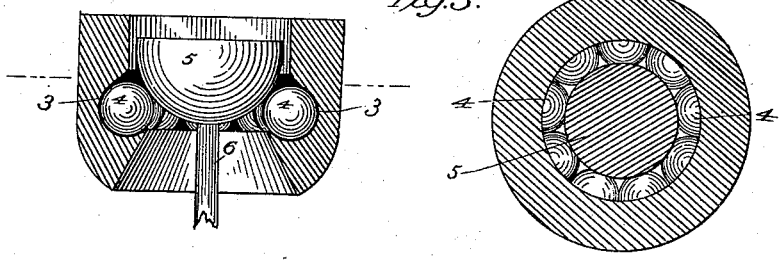

In the accompanying drawings, Figure 1 shows a side elevation of a state-room with my improvement, the special supporting mechanism being shown in section. Fig. 2 shows a perspective view of a stall for sheep or hogs with the supporting mechanism applied thereto. Fig. 3 shows sections of the case which supports the balls and the segmental head.

In Fig. 1, A represents a berth provided with eyes 1 1, connecting with hooks in the bail 2. This bail is rigidly attached to a box or shell made in the form shown, with an annular groove or way, 3, on the inner surface of the box or case. Within this groove or way I place anti-friction balls 4. The box or case may be made of cast-iron and the balls of steel, though any suitable material may be used. Bearing upon the balls is a segment of a sphere, 5, through which passes a connecting-rod, 6, attached thereto by a nut underneath. The space above the way in which the anti-friction balls move is made large enough to permit all necessary movement without allowing the segment to come into contact with the case, so that there can be no binding. Further, as the annular way in which the balls travel may be made of any diameter, the opening for the chain or rod by which the segment is connected to the berth or box may be large enough to give any desired amount of movement when the ship is listed to one side or the other. A precisely similar case or box is fixed to the frame-work of the cabin or state-room directly above, but in an inverted position. The connecting-rod 6 has a similar segment at its upper end, bearing in the same manner upon balls held in a groove. The connecting-rod is of such length only as to allow the two boxes sufficient play.

It will be observed from this construction that whenever the vessel pitches or rolls the connecting-rod will be carried to one side of the upper box and to the opposite side of the lower, shifting laterally upon the balls. The openings in the rounded part of the box opposite each other are round and sufficient to allow of all needed movement. The anti-friction balls make the movement so easy that there is little or no swing of the berth in an endwise direction and no jar, the boxes simply changing their position in relation to each other, allowing the berth to change its horizontal position, while remaining in the same place in respect to other directions. The berth may be stayed by elastic connections, as shown at 7 8, if desired.

In Fig. 2 I have shown the same device applicable to stalls such as are used for sheep or hogs when carried upon ocean-going craft. In this I use only the upper box, and suspend the cage or stall directly to the rod in the segment of a sphere bearing upon the rollers. This permits the cage to be brought up closely to its bearings or supporting-point, affords a broad bearing which gives steadiness thereto, while at the same time permitting free movement in any direction. These stalls are usually between decks, and may be placed one above another. Motion of the stalls may be limited by stay ropes or chains with elastic connection, if desired.

Having thus described my invention, what I claim is—

1. The swinging berth having suspension-rods 2 and the spherical segment 5, in combination with the rigid case having annular groove and provided with anti-friction balls.

2. The combination of the upper and lower boxes or cases, the connecting-rod 6, having segments at each end bearing upon the anti-friction rollers, the bail 2, and the berth hinged thereto, substantially as described.

In testimony whereof I have signed my name to this specification in the presence of two subscribing witnesses.

ALBION P. BICKMORE.

Witnesses:
E. A. DICK,
DAVID H. MEAD.